United States Patent [19]

Singer

[11] 4,437,118

[45] Mar. 13, 1984

[54] PYROELECTRIC VIDICON WITH IMPROVED SIGNAL-TO-NOISE RATIO

[75] Inventor: Barry M. Singer, New York, N.Y.

[73] Assignee: U.S. Philips Corporation, New York, N.Y.

[21] Appl. No.: 175,477

[22] Filed: Aug. 5, 1980

Related U.S. Application Data

[63] Continuation-in-part of Ser. No. 14,665, Feb. 23, 1979, abandoned, which is a continuation of Ser. No. 825,577, Aug. 18, 1977, abandoned.

[51] Int. Cl.[3] .................. H04N 5/33

[52] U.S. Cl. .................. 358/113; 250/333; 250/334; 358/223

[58] Field of Search .................. 358/113, 223; 250/330, 250/333, 334

[56] References Cited

U.S. PATENT DOCUMENTS 3,774,043 11/1973 Le Carvennec .................. 250/330

4,100,574 7/1978 Felix .................. 358/113

*Primary Examiner*—Joseph A. Orsino, Jr.

*Attorney, Agent, or Firm*—Marc D. Schechter

[57] ABSTRACT

A pyroelectric vidicon has an improved signal-to-noise ratio by essentially eliminating pedestal noise and using signal gain to overcome preamplifier noise. Pedestal noise is substantially eliminated by charging the target, during the flyback read period, down to a small fixed value above the quiescent value. This is accomplished by setting the cathode potential, during the flyback read period, at a value below the reference value. The time duration of the flyback read period is such that the target is charged down to a value which is still above the quiescent value.

2 Claims, 10 Drawing Figures

PYROELECTRIC VIDICON WITH IMPROVED SIGNAL-TO-NOISE RATIO

CROSS REFERENCE TO RELATED APPLICATIONS

This application is a continuation-in-part of Ser. No. 14,665, filed Feb. 23, 1979 now abandoned, which was a continuation of Ser. No. 825,577, filed Aug. 18, 1977 now abandoned.

BACKGROUND OF THE INVENTION

The invention relates to pyroelectric vidicons.

The performance of a pyroelectric vidicon (PEV) is, like an video component, determined, in part, by the signal-to-noise ratio (S/N). The increase of the signal or the reduction of noise results in better performance. The noise in the PEV is principally from three sources. These are the preamplifier, the pedestal, and the target. The respective magnitudes of these noises, for a 4 MHz bandwidth, are:

$i_{PA}=1.5$ nA rms (preamp noise)

$i_{PN}=0.5$ nA rms (pedestal noise)

$i_{TN}=0.04$ nA rms (target noise)

The preamplifier noise dominates but the pedestal noise is of the same order of magnitude. Thus, if amplification were used so that the signal is made larger than the preamplifier noise, but the pedestal noise were not eliminated, little gain in the signal to noise ratio would result. Although the pedestal noise depends on the means of pedestal generation, all methods of pedestal generation give rise to appreciable random noise.

SUMMARY OF THE INVENTION

It is a principal object of this invention to reduce noise in a pyroelectric vidicon and to improve the signal-to-noise (S/N) ratio.

In accordance with the invention, the pedestal noise is reduced and gain is introduced into the PEV to overcome the preamplifier noise and achieve a factor of 10 improvement in signal-to-noise (S/N) ratio. In order to reduce pedestal noise, the target is charged, during the period called flyback read, down to a value slightly above the quiescent value by setting the cathode at a potential below the cathode reference value (the cathode reference value being the potential on the cathode during the image readout scan). Since the beam will now read the pedestal level to a fixed value, all non-uniformity and noise is suppressed. In order to increase the gain of the PEV, the read-out is operated in a return beam vidicon mode which will give a large increase in signal-to-noise, once pedestal noise is defeated. In this mode, the electron beam is focussed on the target like a regular vidicon. However, instead of reading the electron beam signal that lands on the target, the electron beam which is reflected from the target is deflected to a grid, which acts as a dynode for a secondary multiplier process. A gain of typically 1,000 or more can be thus obtained, so that the limiting noise is no longer the preamplifier noise but the shot noise in the return beam.

BRIEF DESCRIPTION OF THE DRAWINGS

The invention will be described with reference to the accompanying drawing.

DESCRIPTION OF THE PREFERRED EMBODIMENTS

Figure 1A:
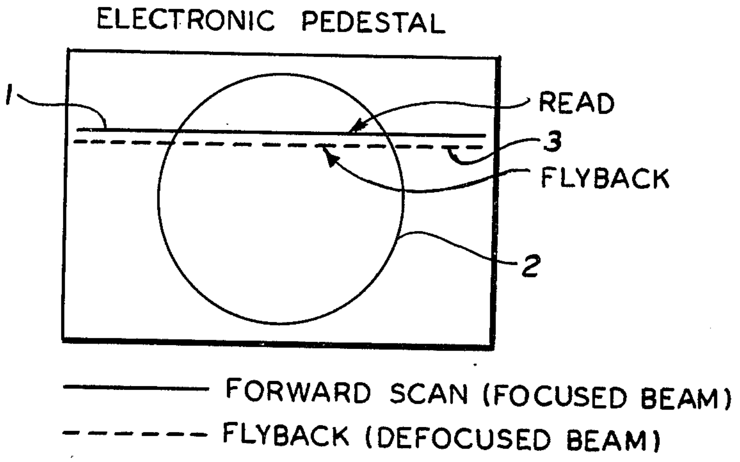
FIG. 1*a* shows a typical raster of a PEV.
Figure 1B:
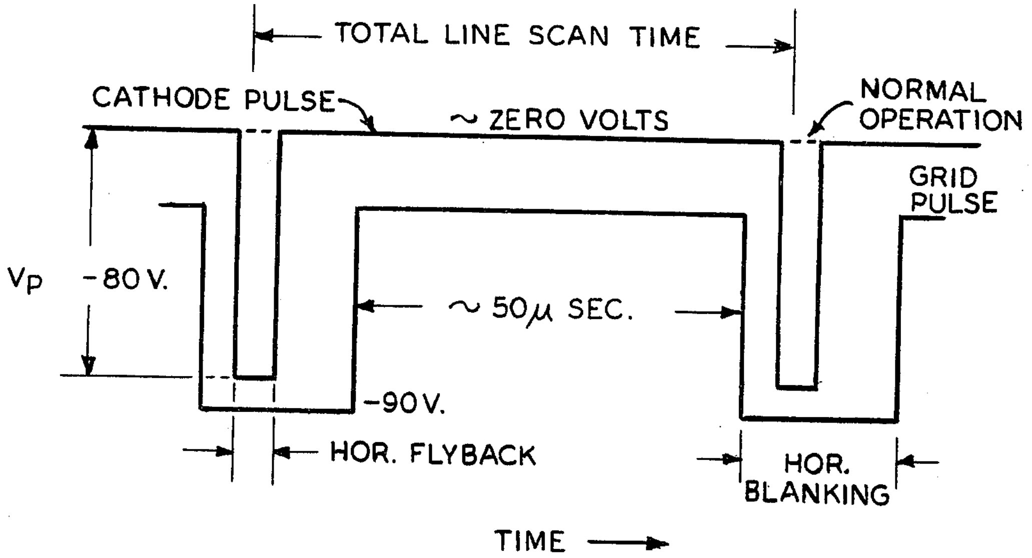
FIG. 1*b* shows the potentials applied to the cathode and to the grid during a known line scan of the raster.

Although the method of reducing pedestal noise disclosed herein may be applied to any means of pedestal generation, the present method has particular application to the secondary emission pedestal method (SEPM). In this method, positive charge is generated on the target by using the electronic horizontal flyback period where as described in U.S. Pat. No. 3,812,396 the video is blanked off. Consider a horizontal line 1 of a raster 2 as shown in FIG. 1. A positive charge may be generated on the target by reducing the cathode potential to −80 V during flyback 3 (instead of leaving it at zero volts). This causes electrons to strike the target at 80 electron volts of energy. With an 80 volt primary electron, the secondary emission coefficient is about 2, i.e., two electrons will leave the target and be collected by the mesh for every one primary electron that lands. The charge thus created on the target is the positive pedestal charge and that charge, read out in one field time, is pedestal current (see, FIG. 1*b*). Unfortunately, this pedestal current is not noiseless.

In addition to the random noise, there is non-uniformity in the pedestal of about 5–10%, which degrades the picture quality. In practice, about 100 nA of pedestal current is used and this results in about 5–10 nA non-uniformity. Considering that a typical pyroelectric signal is 1–2 nA, this non-uniformity can be quite serious when considering the overall tube quality.

Figure 2A:
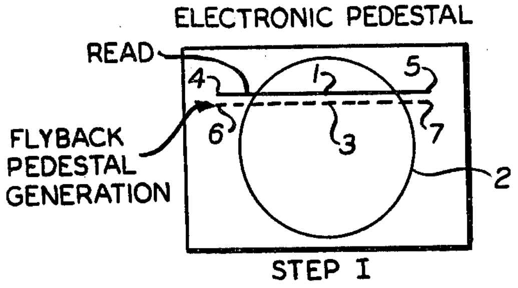
FIGS. 2*a* and 2*b* show PEV rasters according to the present invention.
Figure 2B:
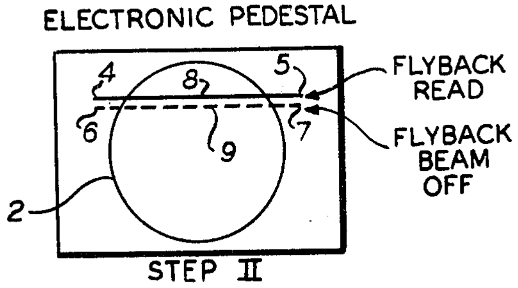
Figure 2C:
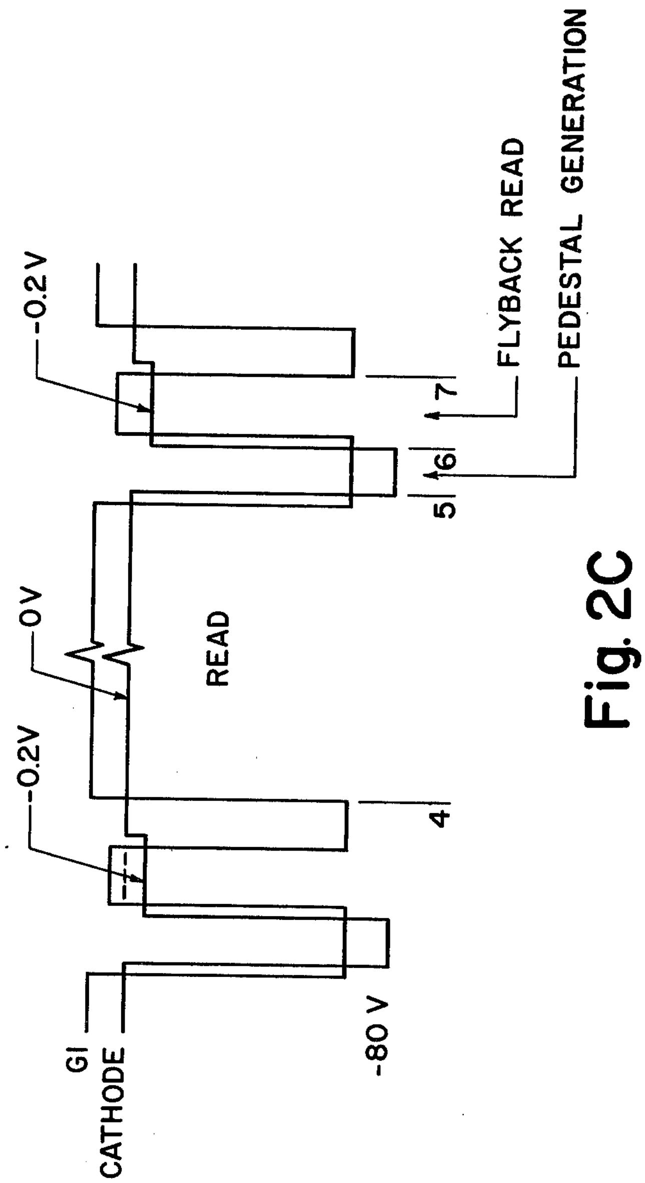
FIG. 2*c* shows the potentials applied to the cathode and to the grid in a PEV according to the present invention.

The pedestal noise and non-uniformity may be greatly reduced, and for all practical purposes eliminated, as follows. Consider FIGS. 2*a*, 2*b* and 2*c* which illustrate an SEPM. FIG. 2*a*, shows the PEV operating in the SEPM. The information is read during forward scan, the beam going from 4 to 5. During this scan the cathode is at a reference potential, and at the end of this scan the potential of the scanned line of the target is equal to a quiescent value. During the blanking interval the beam goes from 5 to 6 and pedestal is generated by pulsing the cathode to −80 V (FIG. 2*c*) and knocking out secondaries, as usual. However, if 100 nA of pedestal current is now required, an excess, e.g., 120–150 nA, is put down. Then, (FIG. 2*b*) the beam again scans over the same flyback line from 6 to 7. Now, however, the cathode is at −0.2 V (or some other potential below the reference potential. As the beam scans over the free surface of the target during the period called flyback read 8, it charges the free surface down to 0.15 to 0.20 V (or some other suitable potential above the quiescent value). This is shown schematically in FIG. 3.

Figure 3:
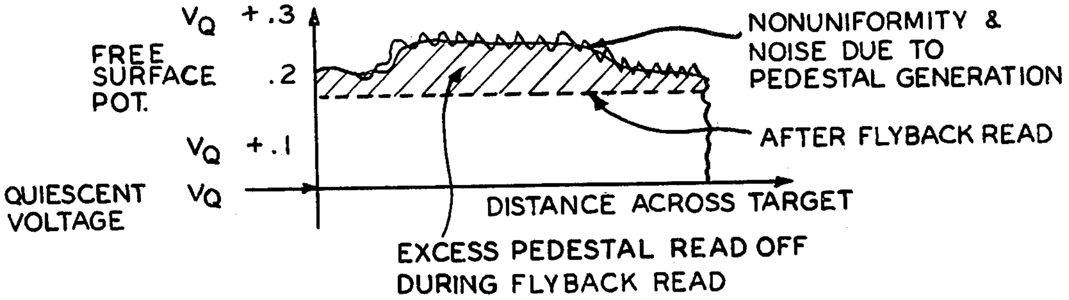
FIG. 3 is a schematic diagram showing how pedestal noise is reduced.

Since the beam reads the pedestal level to a fixed value. 0.15 $V+V_Q$, shown in FIG. 3, all the non-uniformity and noise is suppressed. First calculations indicate that the pedestal noise will become:

$$i_{pN}=0.05\ nA,$$

which is close to the target noise. The beam is then reset, with the beam blanked off, as in a normal vidicon, and starts to read another line.

It should be pointed out that this scheme can be accomplished with no additional flybacks if a gun with two cathodes is used. With this approach, one cathode is on during read and both are on during flyback. One cathode creates the positive charge by being pulsed to −80 volts while the other is held at about −0.2 V to "trim" the pedestal and read it down to a fixed potential.

It should also be pointed out that the invention is not limited to the use of the applied potentials in the above example. Nevertheless, the potential to be applied to the cathode during "flyback read" will always be lower than the reference potential. This is quite a surprising requirement since the target must be at a potential greater than quiescent during integration of the incoming image signal. The solution to this apparent anomaly lies in the fact that the time duration of the flyback read scan is, as a practical matter, too small to allow the target potential to be lowered to the cathode potential. During the flyback read scan the target potential is lowered only part of the way toward the cathode potential.

Accordingly, in any particular application of the present invention the cathode potential during "flyback read" should be chosen to be a value below the reference potential such that during the flyback read scan the target potential will be lowered to a value slightly above quiescent (the latter value depending upon the pedestal current needed).

Having reduced the pedestal noise, gain must now be introduced into the PEV to overcome the preamplifier noise and to achieve a factor of 10 improvement in the signal-to-noise ratio.

Return Beam Read

Figure 4:
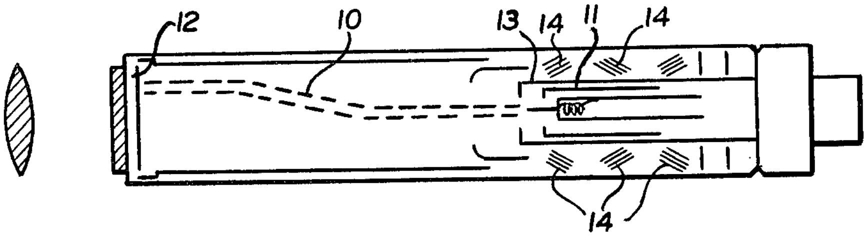
FIG. 4 is a sectional view of a typical return beam vidicon.

Instead of reading in the normal vidicon mode, operating the readout in a return beam vidicon mode will give a large increase in signal-to-noise, once the pedestal noise is defeated. FIG. 4 shows a typical return beam vidicon. In the operation of this device, the electron beam 10 generated by electron gun 11 is focused on the target 12 just like in a regular vidicon. Instead of reading the electron beam signal that lands on the target, however, the electron beam which is reflected from the target is deflected to a grid 13, which acts as a first dynode for a secondary multiplier process. This serves to give gain, $G_M$. The gain can be typically 1,000 or more, so that the limiting noise is no longer the preamplifier noise but the shot noise in the return beam. Other dynodes 14 further amplify the signal. Typically, the beam current directed at the target will be adjusted to be twice the pedestal current, $I_p$, giving a maximum signal capacity equal to pedestal current. The amount of current returning to the first dynode, $i_r$, will be, typically:

$$i_r=I_p$$

The signal-to-noise ratio for return beam operation, $(S/N)_{VR}$, with no pedestal noise can be found to be, $$(S/N)_{VR}=\frac{i_sG_M}{\sqrt{2eI_pG_M^2f^2}}$$

where $G_M$=secondary multiplier gain $I_p$=pedestal current $i_s$=signal current f=bandwidth (video)

2=space charge suppression factor=0.2

The improved signal-to-noise over the present PEV is 9 times.

Isocon Mode

Figure 5:
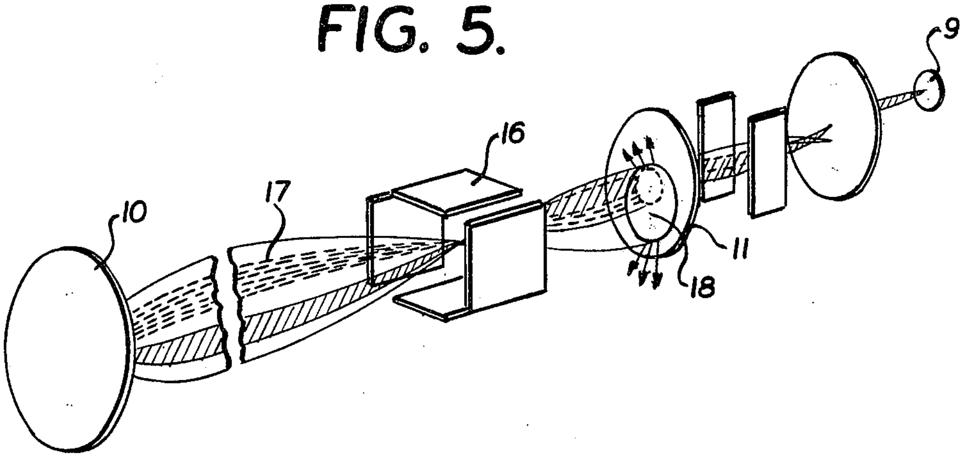
FIG. 5 is an exploded view of a PEV operation in the isocon mode.

The signal-to-noise ratio can be further increased by using the return beam in the isocon mode. In this mode, use is made of the scattered instead of the return reflected beam, i.e., some of those electrons which land on the target are scattered back. In fact, materials such as glassy antimony trisulfide scatter about 4 electrons for every one that lands. Thus, if the pyroelectric target is covered with a 500 A thickness of such a material, a scatter gain of about 4 can be obtained. The isocon principle is similar to the return beam principle except the scattered electrons are focused by steering plates 16 to the first dynode 11 and the return beam electrons 17 are guided through a hole 18 in the dynode. The sketch of the isocon principle is shown in FIG. 5.

The signal-to-noise advantage of the isocon mode comes from the scatter gain, $G_S$. The signal-to-noise ratio for the isocon mode is:

$$(S/N)_{IV}=\frac{i_sG_MG_S}{\sqrt{2eI_pG_M^2G_S\,\Delta f}}$$

Thus the isocon mode gives an increased signal-to-noise ratio of $G_S$ over the return beam mode. Assuming $G_S$ to be 4 this leads to an increase signal-to-noise over the present PEV of:

$$(S/N)_{IV}/(S/N)_P=8.0$$

Figure 6A:
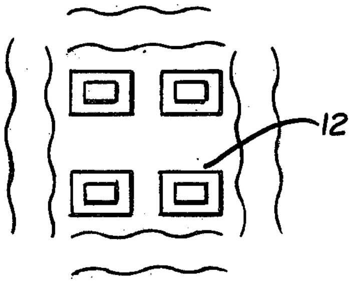
FIG. 6*a* is an elevational view of a reticulated target for a PEV.
Figure 6B:
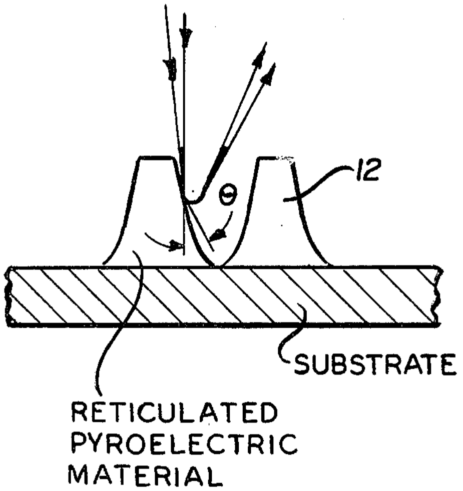
FIG. 6*b* is a plan view of the reticulated target of FIG. 6*a*.

By using a reticulated target with pyramided walls 12 (see FIG. 6), which can be obtained by either the liquid etch or plasma etch method of reticulation as described in application Ser. No. 748,640, filed Dec. 8, 1976, an increased scatter gain can be achieved because the primary beam strikes the target at a glancing angle.

It is known that the scattering increases about as sec $\eta$, where $\eta$ is the angle at which the beam strikes the surface.

This can lead to an increase in scatter gain of 2–3 times. The result is an increased signal-to-noise of 1.4 to 1.7 times. Thus, for an isocon-mode PEV, with reticulated target and with pedestal noise elimination, the overall signal-to-noise is 11 to 14 times that of the present PEV.

What I claim is:

1. A pyroelectric vidicon with an improved signal-to-noise ratio comprising an evacuated envelope having at one end an infrared transparent window, a target of pyroelectric material positioned within said envelope in close proximity to said window, means to generate an electron beam, said electron beam generating means comprising a cathode from which the electrons are supplied, said cathode being operated at a potential equal to a reference value during image readout such that the target potential is equal to a quiescent value after image readout, means to scan said target with said electron beam, and means to generate a pedestal during beam flyback, characterized in that said pyroelectric vidicon further comprises means to charge the target during a flyback read scan to a potential greater than the quiescent value by applying, during the flyback read scan, a potential to the cathode having a value below the reference value, said cathode potential being chosen such that at the end of the flyback read scan the target potential is above quiescent.

2. A method of reducing pedestal noise in a pyroelectric vidicon of the type having a cathode and a target, said cathode being operated at a reference potential during image readout such that the target potential is equal to a quiescent value after image readout, said method comprising, after pedestal generation, the steps of:

setting the cathode potential below the reference potential; and scanning the target with an electron beam emanating from the cathode for a time sufficient to reduce the target potential to a value above the quiescent value.

* * * * *

UNITED STATES PATENT AND TRADEMARK OFFICE

CERTIFICATE OF CORRECTION

PATENT NO. : 4,437,118

DATED : March 13, 1984

INVENTOR(S) : BARRY M. SINGER

It is certified that error appears in the above-identified patent and that said Letters Patent is hereby corrected as shown below:

In the Title Page change the Assignee from "U.S. PHILIPS CORPORATION" to --NORTH AMERICAN PHILIPS CORPORATION--.

Signed and Sealed this

*Seventeenth* Day of *December 1985*

[SEAL]

*Attest:*

DONALD J. QUIGG

*Attesting Officer* *Commissioner of Patents and Trademarks*